Oct. 17, 1967  A. D. COGGESHALL ETAL  3,348,085
SPRING TIGHTENED GENERATOR END TURN SUPPORT CONSTRUCTION
Filed July 20, 1965  2 Sheets-Sheet 1

Inventors:
Almy D. Coggeshall,
Leo A. Mailhotte,
Robert L. Winchester,
by W. C. Crutchey
Their Attorney.

Inventors:
Almy D. Coggeshall,
Leo A. Mailhotte,
Robert L. Winchester,
by W. C. Crulche
Their Attorney.

United States Patent Office 3,348,085
Patented Oct. 17, 1967

3,348,085
SPRING TIGHTENED GENERATOR END
TURN SUPPORT CONSTRUCTION
Almy D. Coggeshall, Leo A. Mailhotte, and Robert L.
Winchester, Schenectady, N.Y., assignors to General
Electric Company, a corporation of New York
Filed July 20, 1965, Ser. No. 473,356
5 Claims. (Cl. 310—260)

ABSTRACT OF THE DISCLOSURE

Dynamoelectric machine stator winding support including a resilient ring mutually lashed to the windings and to the machine frame.

This invention relates to an improved insulating support system for the conducting members of the stator of a dynamoelectric machine. More specifically, it relates to a resilient construction arrangement for securing the end turns of a large dynamoelectric machine to an end turn support framework which is free to move axially as the stator windings expand and contract thermally.

The end turns of a dynamoelectric machine stator are the projecting portions of the stator or armature bars which extend outwardly from longitudinal stator slots. The end turns are necessary in order to reverse the direction of the armature bar and to circumferentially displace the end of the bar so that it can enter a slot almost 180° from the slot from which it emerged. The end turns must also diverge radially from the stator axis in order that they will not obstruct the rotor of the dynamoelectric machine which is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" (radially inner) and "bottom" (radially outer) bars, one practice is to bend the top bars so that they lie tangentially in one direction about this frusto-conical surface and to bend the bottom bars in the opposite tangential direction about the surface of revolution. The matter is further complicated by the fact that although the top and bottom bars are closely adjacent at the location where they emerge from the slot, they must spread radially with respect to one another as they move away from the stator so that space will be afforded for a series loop connecting a top to a bottom bar.

With this background in mind, it will be appreciated that there are many difficulties in devising a suitable structure for supporting and securing the insulated armature bars in the end turn region.

The magnitudes of the various forces exerted on the armature bars, both in the slot region of the stator and in the end turn region are substantial. Various magnetic forces will act upon the armature bars of a large turbo-generator, for example during unbalanced load or sudden "short circuit" conditions. In addition, substantial heat is generated by the passage of electric current through the armature bars and, even though effective gas or liquid cooling of the bars is provided, the thermal expansion and contraction of the bars with respect to stator slots containing them will tend to move the end turns apart in both the radial and axial direction with respect to the longitudinal axis of the stator.

If a rigid framework is utilized to support the end turns, and further if thermal movement of the framework is allowed, it is still necessary to secure the end turns to the framework. This securing means must inhibit vibration between the several stator end turns themselves, and between them and the rigid framework. Vibration of course could be prevented by clamping the end turns together and to the rigid framework with sufficient force to prevent any vibration therebetween. But, it is obvious that if such force should be at all relaxed, such as due to a change in dimensions, or to a slipping of portions of the clamping structure or the end turns which are clamped, the vibration exciting forces remaining, vibrations shall ensue.

Further, the whole assembly including the clamping arrangement must be sufficiently strong to withstand the violent forces created in a larger turbo-generator, such as by sudden "short circuit."

Accordingly, it is an object of this invention to provide an arrangement for securing the end turns of a dynamoelectric machine to a rigid framework, so as to prevent vibrations between the framework and the several end turns.

It is another object of this invention to provide a resilient securing means for securing end windings to a rigid framework so as to prevent vibration during normal operation, and which further provides a nonresilient retaining means for limiting the movement of the end turns with respect to the rigid framework during the occurrence of excessive vibration exciting forces.

These objects are accomplished in accordance with this invention, in one form thereof, by providing a rigid framework radially outward from the end turns for supporting the end turns, and a construction arrangement for resiliently securing the end turns to the rigid framework. The securing arrangement includes a resilient member which maintains a resilient force upon the armature bars with respect to the framework. The securing arrangement further provides a rigid retaining structure to limit the movement of the armature bars with respect to the rigid framework during the occurrence of excessive vibration exciting forces.

Generally, stated, the invention is practiced by providing inner and outer radially spaced support members secured together with tension members passing among the armature bars. A spring member is provided on the inner support members such that a spring force is applied to the tension members so as to hold the entire group of end turns together as a rigid structure. "Conformable" pads are used between the bars and the support members to completely support the bars. The support framework is mounted in special brackets to be axially slidable with respect to the stator casing so that thermal "breathing" can take place.

Figure 1:
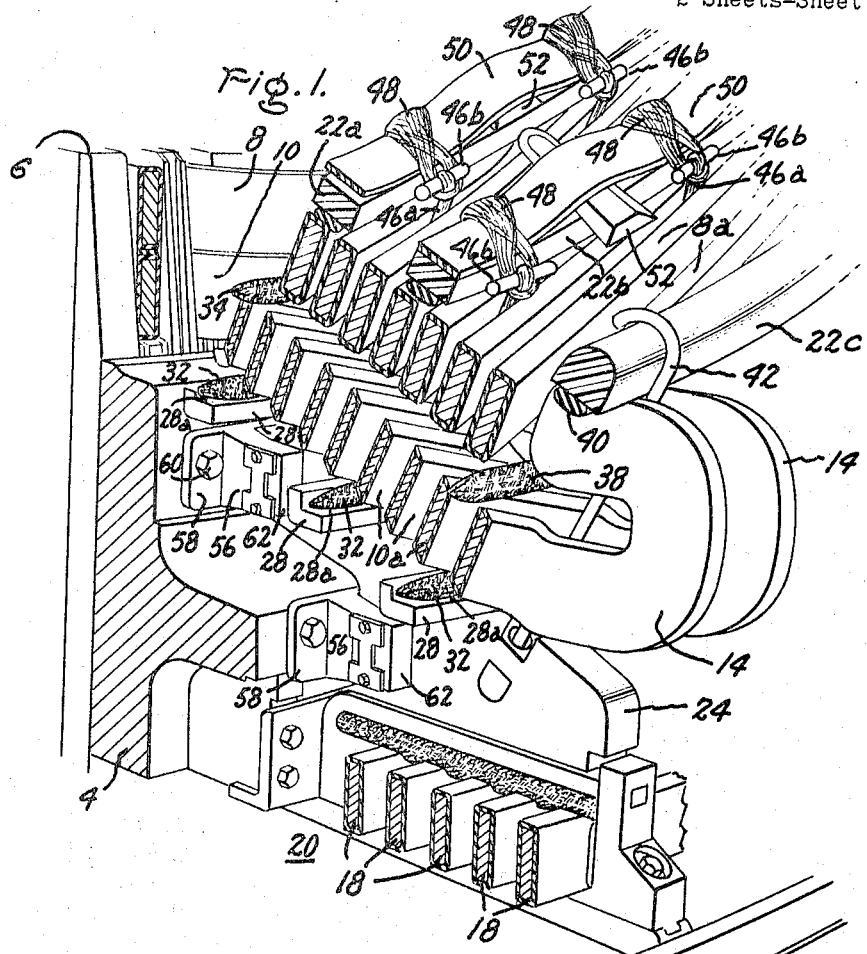
FIG. 1 is a perspective fragmental view showing the lower part of one end of the stator, illustrating the disposition of the armature bars with respect to the stator.
Figure 2:
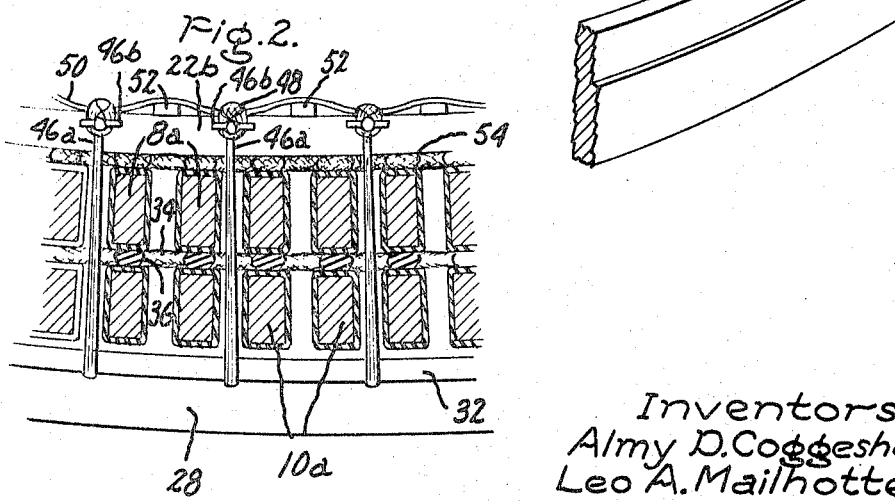
FIG. 2 is a fragmentary cross-sectional view taken along the line II—II in FIG. 3.
Figure 3:
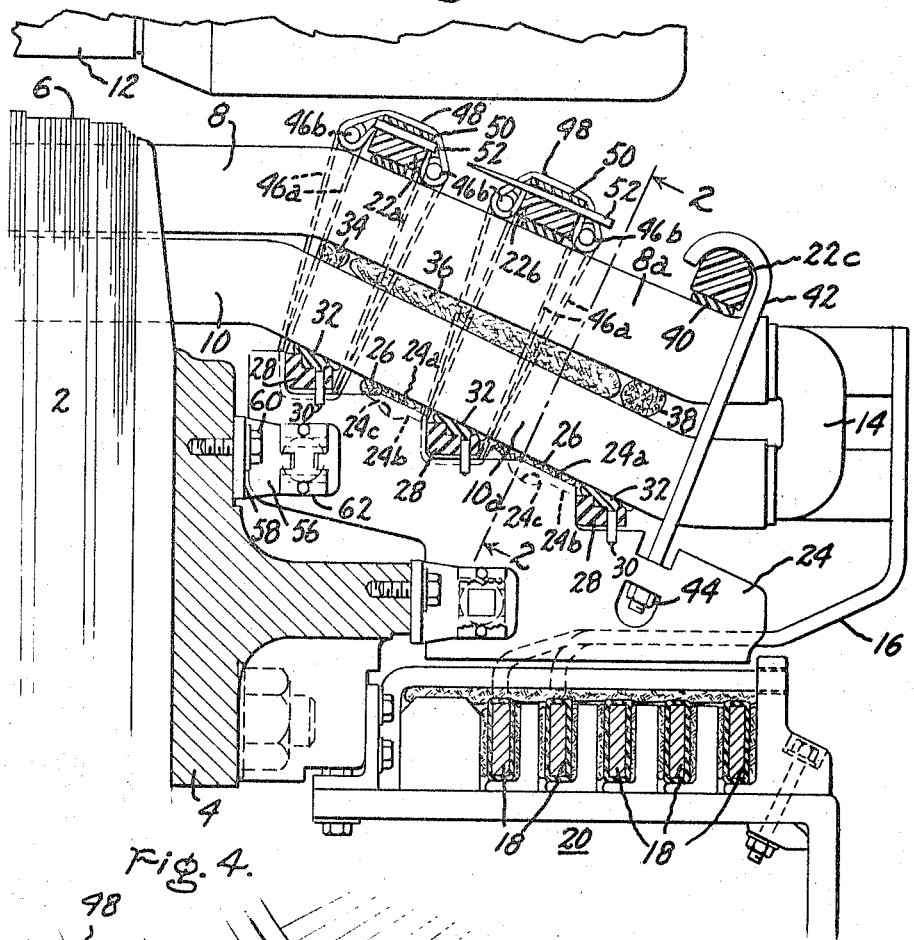
FIG. 3 is a horizontal elevation, partly in section, showing the spring tightened support system at one end of the generator stator.

Referring now to FIG. 1 of the drawings, a perspective view is shown of a portion of a stator 2 which includes a circumferential flange ring seen at 4. The rotor (not shown) turns in bore 6 shown near the top of FIG. 1. As will be familiar to those skilled in the art, the main structural members of the stator including the flange ring 4 and other support members (not shown) enclose and support a large number of slotted core laminations defining the stator central bore 6 and through which pass the slot-lying portions of top armature bars 8 and bottom armature bars 10. Top bars 8 bend both circumferentially and radially as they come out of the slot and continue in an involute curve as shown at 8a in FIG. 1. Similarly bottom bars 10 also diverge radially but in an opposite circumferential sense as seen at 10a. Thus these portions 8a and 10a are both "skewed" with respect to the stator axis, as will be plain from the perspective view in FIG. 1. A clearer understanding may be had by reference to the horizontal elevation of FIG. 3. There the bar portions 8a, 10a have been rotated into the plane of the drawing, although it is understood that actually they run in opposite circumferential directions. Portions 8a, 10a are bent in an involute-type configuration so as to lie tangentially to a frusto-conical surface of revolution taken about the stator axis. FIG. 3 also shows a potrion of the generator rotor 12 which rotates in bore 6 of the stator.

A top bar on one side of the stator circumference is connected with a bottom bar approximately diametrically opposite, this connection being made with a "series loop" 14. It will be understood that series loop 14 is rotated into the plane of the drawing in FIG. 3 in order to show the proper spacing of the members in a radial direction and that it does not actually connect the portions 8a and 10a emerging from the same slot.

At intervals about the stator circumference, power is withdrawn from the armature windings through flexible leads 16 passing to circumferential connecting rings 18. Connecting rings 18, in turn, are connected to the high voltage outlet terminals (not shown).

The supporting structure holding connecting rings 18 in position is shown generally at 20. Several such connecting ring support structures 20 are circumferentially spaced about the stator outside of the end turns and are attached to circumferential flange 4 by bolting or welding to radial webs 4a preferably made integral with the circumferential flange 4.

Turning now to the support system for the armature end windings, the top bar extending portions 8a and the bottom bar extending portions 10a are held by inner support rings 22a, 22b, and 22c and outer support members 24. The outer support members 24 are circumferentially spaced about the stator bore and extend generally axially and radially outward therefrom, disposed substantially coplanar with the stator axis. In the embodiment shown, there is an outer support member 24 for each three stator slots. The outer support members 24 define support surfaces 24a which diverge as elements of a cone from the stator while bar portions 10a cross it diagonally. The outer support members 24 are preferably constructed of high strength insulating material. A suitable material for this use is Permali, which is the trademark of a laminate construction of thin wood veneers bound with a synthetic thermosetting resin and sold by Permali, Inc.

Surfaces 24a of support members 24 are furnished with longitudinal grooves 24b. The grooves may vary in depth as indicated at 24c to form a lock or key as will be amplified at a latter point. Disposed in grooves 24b and extending above surfaces 24a are elongated pads of thermosetting resin 26. These are placed in the grooves during assembly in an uncured or pliable state and several suitable compositions are commercially available, such as the thermosetting resin sold under the trade name Glaskyd 1901 by Perrysburg Laboratories. This material has the ability to cure to a rocklike hardness at an elevated temperature and possesses both compressive strength and good insulating qualities.

In order to provide circumferential or lateral support for the spaced outer support members 12, rigid insulating hoops 28 are employed which are secured to support members 24 by suitable means such as pins 30. Hoops 28 each have a circumferential groove 28a in which are placed additional pads of thermosetting resin 32, which may also be of the Glaskyd 1901 composition. Pad 32 is also in its uncured, pliable state during assembly.

In order to provide a radial separator between portions 8a, and 10a of the armature bars, spacers 34, 36 and 38 of a suitable thermal setting rigid insulating material are employed and are interposed between portions 8a, 10a. These take the compressive load between portions 8a, 10a formed when the inner rings 22a, 22b, and 22c are secure to the outer support members 24. Arcuate spacer 38 is of a greater thickness than arcuate spacer 34 in order to provide for radial divergence of the top bars with respect to the bottom bars. Radial spacer 36, aligned with support members 24 may also be employed. These spacers 34, 36 and 38 may be pads of thermosetting material as described previously or may be of other suitable insulating material.

A pad of thermosetting resin 40 is interposed between portion 8a and outer ring 22c. Ring 22c is provided with a semi-circular perimeter 22d, which is engaged by the hook of a hook boot 42 which clamps ring 22c to the support member 24. The hook bolt 42 is secured to support member 24 and placed in tension by a nut 44.

Inner support rings 22a and 22b are resiliently fastened to outer support members 24 by special insulating tension members 46, which consists of loops of glass rope 46a impregnated with thermosetting resin, passing around insulating hoops 28 and terminated at rods 46b. The rods are supported from the rings 22a and 22b by additional glass rope members 48.

While the resilient supporting arrangement of this invention is not provided with respect to ring 22c, it is provided with respect to rings 22a and 22b. This resilient arrangement includes spring strips 50 which are laid along the top surfaces of rings 22a and 22b, as is seen in FIGS. 1 through 4. The spring strip may be formed of filament wound reinforced plastic. The glass rope members 48 which support rods 46b, are placed over the strips 50. The rods 46b of special tensioning members 46 are secured to rope member 48 after the rings 22a and 22b are forced toward the support member 24 and hoops 28 by tightening clamps. All possible slack is removed from between the rings 22a and 22b and the outer support member 24 before the tensioning members 46 are utilized to secure the rings 22a and 22b to the support member 24.

After rings 22a and 22b have been secured to the outer support members by the tensioning members 46, the strip spring 50 is arched radially inward between the glass ropes 48 and maintained arched by wedge shaped fulcrum blocks 52 which are forced in place between the strip springs 50 and the rings 22a and 22b.

Figure 4:
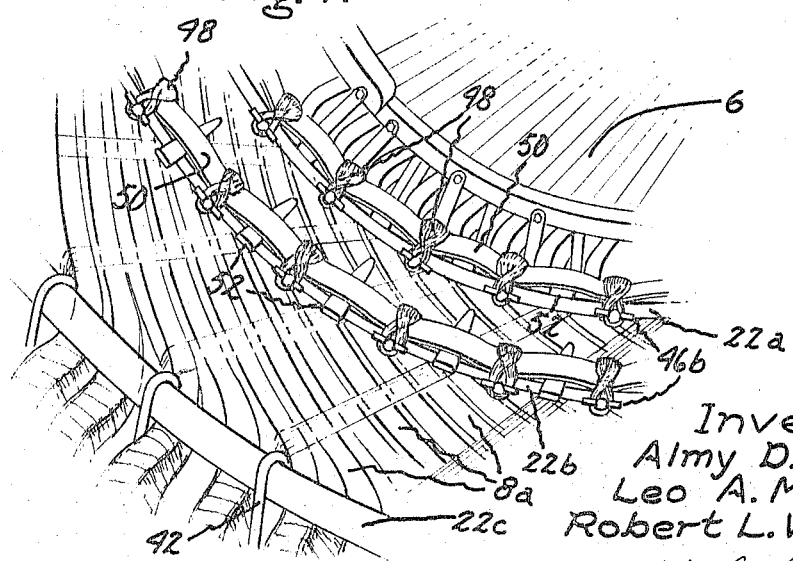
FIG. 4 is a perspective fragmentary view of the inside lower part of one end of the stator, illustrating the spring tightened support system at one end of the generator stator.

The wedge-shaped fulcrum blocks 52 are initially longer than are used in the final assembly, and are provided with a point, such that they may be driven between the rings 22a and 22b and the spring strips 50. The wedges 52 driven between ring 22b and strip spring 50 are shown in FIGS. 1, 3 and 4 before being cut off. After the wedges are driven between the strip springs and the rings, they are cut off even with the rings, such as those shown with ring 22a in FIGS. 1, 3 and 4. As is seen most clearly in FIG. 2, after the wedges 52 are driven in place, the strip spring 50 is lifted off of the rings 22a and 22b between th glass ropes 48 which are connected to the tension members 46.

The dimensions of the strip springs 50 are chosen so as to produce a force on each glass rope 48 which is substantially greater than the minimum required to suppress vibration. The distance which the spring strip 50 is lifted from the rings 22a and 22b immediately under the glass ropes 48, should be at least an order of magnitude larger than any anticipated settling or slipping of end turn portions 8a and 10a. Thus, the spring forces provided by spring strips 50 will be essentially unchanged for any settling or slipping of the end turns, and thereby permanent tightness of the assembly is achieved.

In the event of a sudden short circuit in the dynamoelectric machine, the spring strips 50 will move through a small excursion, and then engage the support rings 22a and 22b immediately under the glass rope 48. The load or force is now carried entirely by the support rings 22a and 22b, and by tension in the tension members 46. The tension members 46 are provided with a breaking strength well in excess of any predicted forces which might be applied to them. Thus, strength and positive tightness are incorporated in the disclosed resilient securing means.

The resilient securing arrangement including the spring strip 50, the inner rings 22a and 22b and the tension members 46, are effective in reducing vibratory motion during normal operation and during short circuits, by providing both radial and transverse support. The rings 22a and 22b in combination with the tension members 46, and the radial hoops 28 principally provide firm support against radial motion of the armature bars 8 and 10. Pads 54 of thermosetting resin are interposed between the rings 22a and 22b and outer portion 8a of top armature bar 8. When the assembly is heated, so as to cure pad 54, it will be molded over the narrow edges of the bars 8a, so as to provide support of the bars 8a against transverse motion. Pads 26 are deformed to be locked into the grooves 24b and over the narrow edges of bars 10a before they are cured, so as to support bars 10a against transverse motion. Similar support against transverse motion is also provided by deformation of pads 32 and spacers 34 and 36.

The support members 24, and the insulating hoops 28 constitute a rigid support framework to which the armature bar portions 8a and 10a are resiliently secured by the tension members 46, the spring strips 50 and the inner support rings 22a and 22b. In order to permit this support framework and the armature bar portions 8a and 10 resiliently secured to it to move axially with thermal expansion and contraction of the slot-lying portions of the armature bars, special support brackets 56 are used to secure the outer support members 24 to the stator flange 4.

Reference to FIGS. 1 and 3 of the drawing will show that the bracket comprises a base 58 secured to flange 4 by suitable means such as bolts 60. The bracket 56 which includes an upstanding portion 62 on each side of the support member 24, permits axial movement of the support member 24 with respect to the flange ring 4.

It is thus seen that the end turn portion 8a and 10a are resiliently secured by tension members 46 and spring strips 50 to a rigid framework comprising principally the outer support members 24, and the hoops 28. While portions 8a and 10a are firmly supported, axial movement of the framework is permitted by the special support brackets 56. The spring strips 50 maintain a spring force on the tension members 46, such that with any relative movement between the portions 8a and 10a, or with their expansion or contraction due to heating, nevertheless they are firmly retained by the resilient spring force. Further, under extreme forces, such as due to a sudden short circuit in the generator, the travel of the spring strips 50 is limited by the inner support rings 22a and 22b, which thereby limit the movement of the end turn portions 8a and 10a with respect to the outer support member 24.

While a particular embodiment of the invention has been shown, other embodiments of this invention will be apparent to those skilled in the art, and it is intended to cover by the appended claims all embodiments falling within the scope thereof.

What we claim as new and desire to secure by Letters Patent of the United States is:

1. In a dynamoelectric machine including a stator winding having end turns, and a support means radially displaced from the end turns for supporting the end turns by engaging the radially outer portions thereof, a resilient arrangement for securing the end turns to the support means comprising:
 (a) a ring abutting the radially inner portions of the end turns which are opposite the radially outer portions,
 (b) a spring strip circumferentially secured to said ring on a side thereof opposite the end turns,
 (c) a plurality of tension members for securing said spring strip and said ring to the support means, so as to secure the ends turns between the support means and said ring,
 (d) a plurality of fulcrum blocks interposed between said ring and said spring strip intermediate said tension members, so as to cause said spring strip to be lifted from said ring under said tension members, whereby said spring strip is deflectable to maintain a resilient force on said tension members, said ring, and the stator winding end turns.

2. The resilient arrangement for securing stator winding end turns defined in claim 1, wherein a plurality of said rings and said spring strips are provided to maintain a resilient force on said tension members, said rings, and the stator winding end turns.

3. The resilient arrangement for securing stator winding end turns defined in claim 1, wherein said spring strip is formed of filament wound reinforced plastic.

4. In a dynamoelectric machine including a stator winding having end turns, and a support means displaced radially outward from the end turns for supporting the end turns by engaging the radially outer portions thereof, a resilient arrangement for securing the end turns to the framework comprising:
 (a) a rigid ring mounted radially inward of said end turns and abutting the radially inner portions thereof,
 (b) a spring strip mounted along the inner circumference of said ring,
 (c) a plurality of circumferentially spaced tension members passing between the end turns and attached to the support means and to said spring strip for securing said spring strip and said ring to the support means, so as to secure the end turns between the support means and said ring,
 (d) a plurality of rigid fulcrum blocks interposed between said ring and said spring strip intermediate said tension members, so as to cause said spring strip to be lifted from said ring between said tension members, whereby said spring strip is deflectable under said tension members to maintain a resilient force on said tension members and the stator winding end turns.

5. The resilient arrangement for securing stator winding end turns defined in claim 4, wherein comformable pads are interposed between the support means and the radially outer portions of said end turns, and between the radially inner portions of the end turns and said ring, so as to completely support the end turns.

References Cited
UNITED STATES PATENTS

| | | | |
|---|---|---|---|
| 2,602,829 | 7/1952 | Fromm et al. | 310—260 |
| 3,075,112 | 1/1963 | Andersen et al. | 310—260 |
| 3,089,048 | 5/1963 | Bahn et al. | 310—260 |

MILTON O. HIRSHFIELD, *Primary Examiner.*

L. L. SMITH, *Assistant Examiner.*